United States Patent [19]

Johnson

[11] 4,155,431

[45] May 22, 1979

[54] SPRING-SET CALIPER BRAKE

[76] Inventor: Norman A. Johnson, 5325 10th Ave., Delta, B. C., Canada, V4M 1X6

[21] Appl. No.: 797,781

[22] Filed: May 17, 1977

[51] Int. Cl.$^2$ ............................................. F16D 65/24
[52] U.S. Cl. ................................. 188/170; 188/59; 188/72.6; 188/167; 192/70.29; 192/91 R
[58] Field of Search ............... 188/59, 72.6, 72.9, 188/170, 166, 167, 171, 173; 192/70.29, 90, 91 R

[56] References Cited

U.S. PATENT DOCUMENTS

| 2,348,078 | 5/1944 | Ledwinka | 188/59 |
| 3,253,681 | 5/1966 | Butler | 188/72.9 |
| 3,661,234 | 5/1972 | Moederndorfer et al. | 188/170 |
| 4,018,140 | 4/1977 | Engle | 188/170 |

FOREIGN PATENT DOCUMENTS 992884  7/1976  Canada ................................. 188/72.6

Primary Examiner—George E. A. Halvosa

[57] ABSTRACT

A spring-set power-released caliper brake, adapted to grip the sides of a clamped member and, specifically, to provide a substantially uniform clamping force irrespective of actuator spring extension. The caliper brake includes a base mounted in fixed relation with respect to the clamped member. An actuator lever and an actuated lever are pivotally mounted in the base intermediate their ends. One of a pair of brake shoes is pivotally mounted on one end of each lever. The cylinder portion of a spring-set, power-released linear actuator is secured to the other end of the actuator lever and a compensating link is pivotally mounted in the other end of the actuated lever. The thruster portion of the linear actuator is pivotally connected to one end of the compensating link. One end of a toggle link is interconnected to the other end of the compensating link and the other end of the toggle link is interconnected to the actuator lever.

8 Claims, 5 Drawing Figures

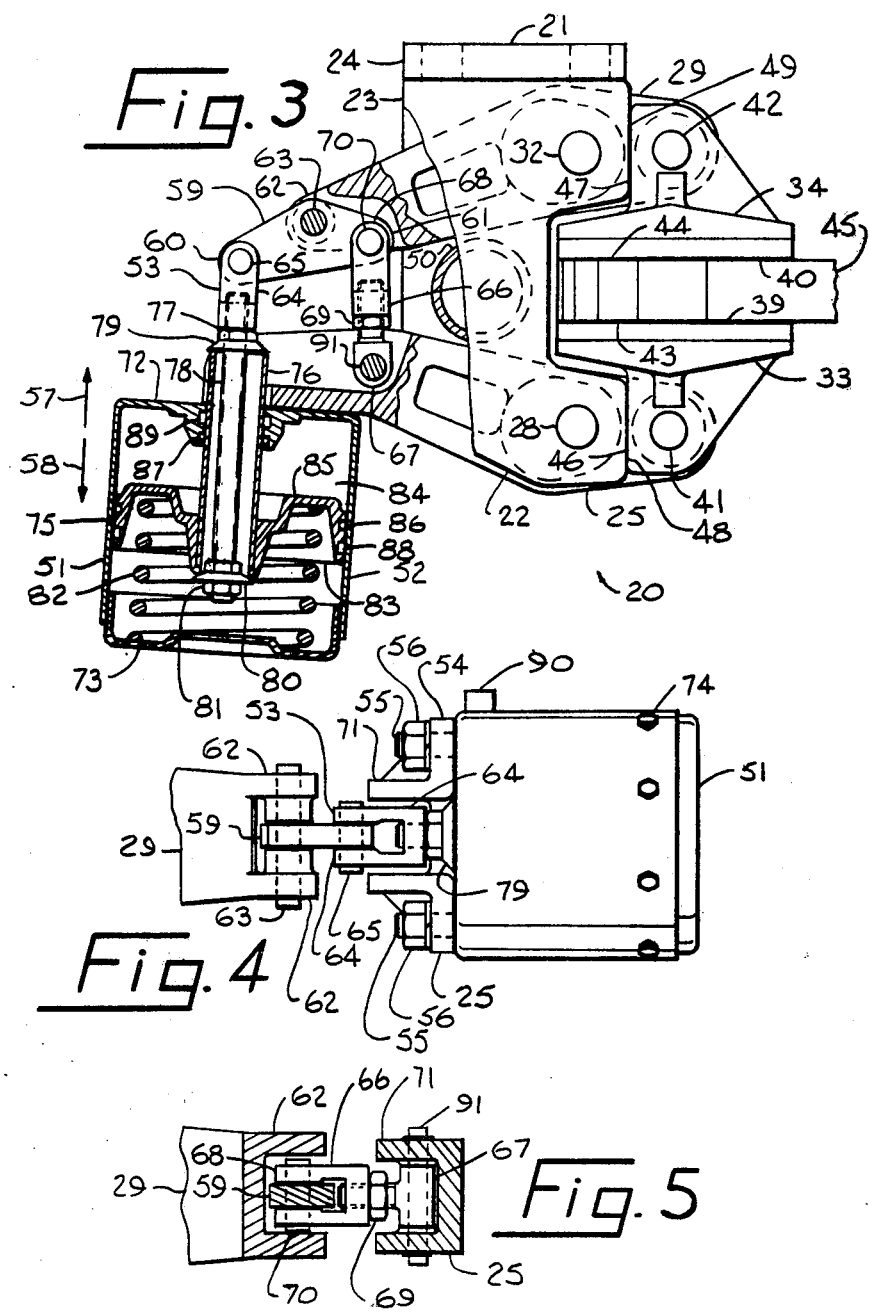

SPRING-SET CALIPER BRAKE

This invention relates to caliper brakes, and devices having the general character of caliper brakes, which apply substantially equal and opposite normal forces to opposite sides of a clamped member, such as a rotatable disc or wheel or a stationary crane rail, and are adapted to sustain friction forces in planes substantially perpendicular to those normal forces. More particularly, this invention relates to spring-set, power-released caliper brakes known in the art to which they pertain as brakes which are spring applied and are employed, commonly in such equipment as hoisting machinery, where the brake is automatically set by the spring when the release power source either fails or is otherwise interrupted. Specifically, the present invention is adapted to provide a substantially constant brake clamping force irrespective of spring extension or retraction which varies with caliper brake component wear, maladjustment, or brake shoe wear.

A spring-set, power released caliper brake adapted for use in back-up or safety applications should satisfy several requirements. First, the spring force, being a function of spring constant and degree of stored energy, should be compensated for, either mechanically or in some other fail-safe manner, such that the brake clamping force is neither too high nor too low and is substantially constant over the operative range of spring deflection. Second, a compensating mechanism should enhance the mechanical advantage of the caliper, such that the spring force is multiplied by as large a factor as possible consistent with the structural integrity of the caliper components and the wear characteristics of the brake shoes. Third, a simple and ecomonical means should be provided whereby friction forces on the brake shoes are transferred to the caliper frame and base. Fourth, components of the caliper and spring force compensating mechanism should be so arranged as to permit minimum dimensions perpendicular from and on at least one side of the clamped member to facilitate incorporation of the caliper in other equipment. Fifth, the caliper structure should automatically center the shoes relative to the clamped member, when the brake is power-released, to prevent the shoes dragging on the clamped member. Sixth, the caliper structure should automatically permit the brake shoes to float and self-center on the clamped member, when the brake is spring-set, to ensure substantially equal and opposite clamping forces on the clamped member. Seventh, the caliper structure should permit use of actuators which are spring-set and either pneumatically released, hydraulically released, or electromagnetically released.

Accordingly, one object of this invention is to provide an improved spring-set, power-released brake in which the brake clamping force is maintained substantially constant throughout the working deflection of an actuator spring.

Another object of this invention is to employ a spring-force compensating mechanism which may be used to increase the mechanical advantage of the caliper mechanism where the brake is employed for holding, as opposed to dynamic, service and brake shoe wear is not severe.

Yet another object of this invention is to provide an improved spring-set, power-released caliper brake where simplified base structure provides support for all clamping and friction forces, while at the same time providing automatic, non-dragging, rigid, self-centering retraction and permitting floating, self-centering clamping of the brake shoes relative to the clamped member.

Still another object of this invention is to provide a caliper structure in which the spring force compensating mechanism is neatly integrated into the space envelope of the caliper substantially without increasing the caliper dimensions either perpendicular to the clamped member of laterally on one side of the clamped member.

A further object is to provide a spring-set, power-released caliper brake having a spring force compensating mechanism which is readily adaptable to spring actuation and either pneumatic, hydraulic, or electromagnetic power release.

These and still further objects and advantages of the present invention reside in the details of construction of a preferred embodiment disclosed herein and will be evident to one skilled in the art from a study of the specification and accompanying drawings. Therefore, the preferred embodiment disclosed is merely exemplary and is not intended to detract from the full scope of the invention as set out in the annexed claims.

In the drawings, wherein like numerals refer to like parts:

FIG. 3 is a partially sectioned plan view of a spring-set, power-released caliper brake taken substantially along line 3—3 in FIG. 2, illustrating the internal structure of a typical fluid-released spring actuator familiar to those skilled in this art, the caliper being spring set and the clamped member being clamped;

FIG. 4 is a partial end view of a spring-set, power-released caliper brake taken substantially along line 4—4 in FIG. 1;

FIG. 5 is a sectional view of a spring force compensating mechanism taken substantially along line 5—5 in FIG. 1.

Figure 1:
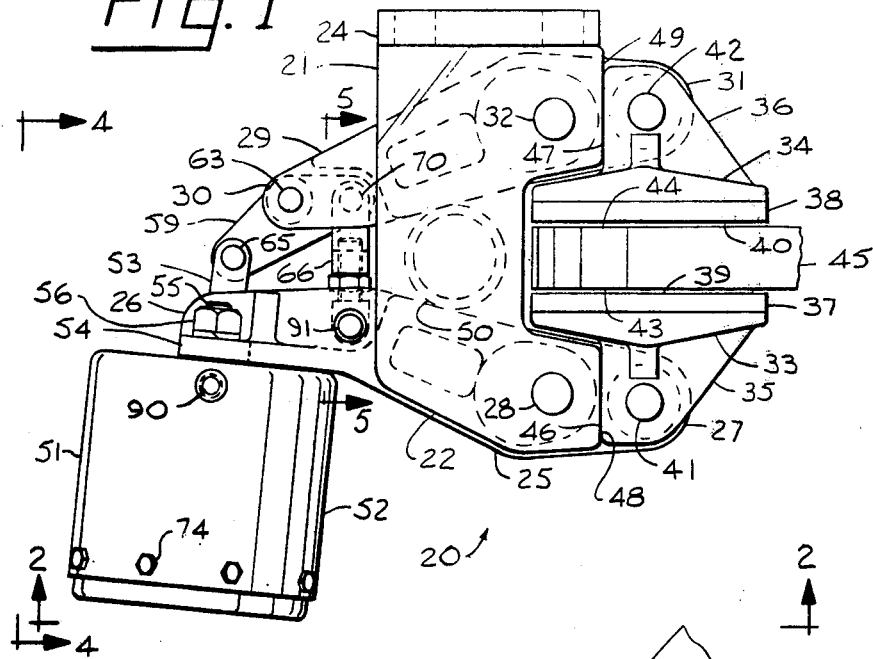
FIG. 1, is a plan view of a spring-set, power-released caliper brake in accordance with the present invention looking parallel to the surfaces of a clamped member.
Figure 2:
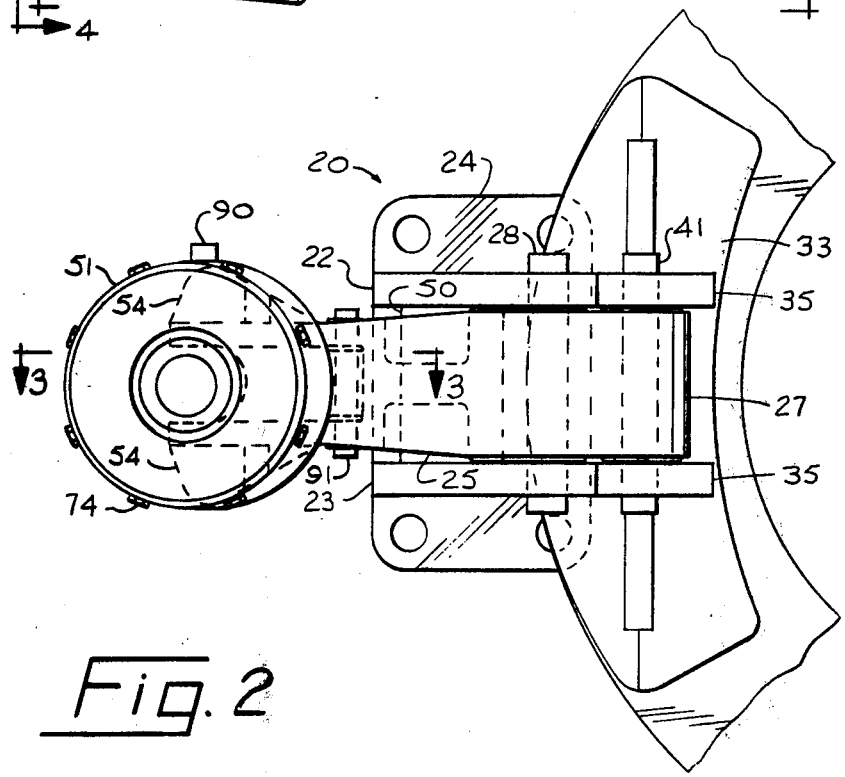
FIG. 2 is a side view of a spring-set, power released caliper brake taken substantially along line 2—2 in FIG. 1.

Referring now to the drawings, FIGS. 1 and 2 illustrate the general structure of a preferred embodiment of a lever-actuated spring-set and power-released caliper brake 20 in accordance with the present invention. Caliper base means 21 comprises a pair of yoke plates 22 and 23, mounting flange means 24, and lever centering member 50 disposed between and secured to yoke plates 22 and 23. A first lever means 25 is pivotally mounted, intermediate its actuated end 26 and actuating end 27, between yoke plates 22 and 23 by means of pivot pin 28. A second lever means 29 is also pivotally mounted, intermediate its actuated end 30 and actuating end 31, between plates 22 and 23 by means of pivot pin 32.

A pair of brake shoe means 33 and 34, having actuation lug means 35 and 36, friction lining means 37 and 38, and brake surfaces 39 and 40 are pivotally mounted respectively on actuating ends 27 and 31 of levers 25 and 29 by means of pivot pins 41 and 42. Brake surfaces 39 and 40 are substantially parallel to clamped surfaces 43 and 44 of clamped member 45. The axes of pivot pins 41 and 42 lie in planes spaced away from and substantially parallel to clamped surfaces 43 and 44. Actuation lugs 35 and 36 include guide surfaces 46 and 47 in slidable opposed relation to guide surfaces 48 and 49 on yoke plates 22 and 23. Guide surfaces 46, 47, 48, and 49 lie in a plane substantially perpendicular to clamped surfaces 43 and 44 and parallel to the axes of pivot pins 28, 32, 41, and 42. It will be evident to one skilled in this art that sufficient clearance must be provided between guide surface pairs 46–48 and 47–49 to permit full retraction and actuation of brake shoe means 33 and 34.

Referring now also to FIGS. 3, 4, and 5, spring-set, power-released linear actuator means 51 includes housing portion 52 and thruster portion 53. Housing portion 52 is secured to a pair of actuator lugs 54 by stud means 55 and nuts 56. Thruster portion 53 is spring actuated in direction 57 and fluid actuated in direction 58. Compensating lever means 59 is pivotally mounted, intermediate its thruster end 60 and toggle end 61, between a pair of lugs 62 on the actuated end 30 of lever 29 by means of pivot pin 63. Thruster portion 53 is pivotally interconnected to thruster end 60 of compensating lever 59 by clevis 64 and pivot pin 65. Toggle link means 66 comprises eye portion 67 threaded into clevis portion 68 and jam nut 69. Clevis portion 68 is pivotally interconnected to toggle end 61 by pivot pin 70, the assembly thereof being of overall stacked depth to fit between the recessed cavity defined by lugs 62. Eye portion 67 is pivotally mounted between lugs 71 on the actuated end 26 of lever 25 by pivot pin 91 at a location intermediate the axis of actuation of thruster 53 and the pivotal axis of pin 28. The exact location of pin 91 and the proportions of compensating lever 59 and toggle link 66 will vary with spring characteristics and will be a matter of design for a lever actuated caliper of given proportions.

Linear actuator means 51 is typical of spring-set fluid-released actuators known to those skilled in this art. Housing portion 52 includes head-end 72 and back-end 73 secured together by bolts 74. Thruster portion 53 includes piston means 75 having tubular rod portion 76 extending through head-end 72. A thruster alignment means 77, including a loose-fitting threaded rod 78 secured axially in tube 76 by threaded fitting 79 and 80, by clevis 64 and jam nut 81, compensates for angular movement of compensating lever 59 with respect to housing portion 52. Compression spring means 82 is caged between back-end 73 and side 83 of piston 75. Fluid release chamber 84 is defined by the inner surfaces of head-end 72, the outer surface of tube 76, and side 85 of piston 75. Seals 86 and 87 seal the slidable surfaces respectively between piston 75 and housing 52 and between tube 76 and head-end 72. Wiper rings 88 and 89 are intended to protect seals 86 and 87. Clearly, admission of fluid under pressure into chamber 84 through port 90 provides power to compress spring 82 and the caliper brake thereby to release clamped member 45; equalization of fluid pressure on both sides of piston 75 will permit spring 82 to extend and the caliper brake thereby to clamp member 45.

It will be evident to those skilled in these arts that pins 28, 32, 41, 42, 63, 65, 70, and 91 may be secured axially by a variety of means, one of the simplest being cotter pins. Further, it will also be evident that in disc brake applications, friction lining means 37, and 38 are normally secured to shoes 33 and 34 by means of bonding cements or rivets; in other applications, such as in rail clamps where minor surface damage to the clamped member is of little concern, hardened metal serrated brake shoe means may be secured by bolt means directly to the actuating ends of levers 25 and 29.

It will be further evident to those skilled in this art that spring-set linear actuator means employing either pneumatic, hydraulic, or electromagnetic power release may be adapted to the present invention. The clamped member, while illustrated as being a disc, could likewise be a crane wheel or crane rail. The linear actuator might be located between the actuated ends of levers 25 and 29.

It is believed that my invention of a lever actuated caliper brake will have been clearly understood from the foregoing detailed description of my now preferred and illustrated embodiment. Various modifications, changes, additions, and equivalents may be resorted to in view of these teachings by one skilled in this art without departing from the spirit of my invention. Therefore, the present invention is not to be construed as limited to the specific details illustrated and described above, and whereas a choice between variations, modifications, changes, additions, and equivalents falling within the true scope of my invention will depend largely upon the circumstances in which it is used, it is my express intention that no limitations be implied and that the hereto annexed claims be given the broadest interpretation to which the language fairly admits.

The embodiments of the invention in which an exclusive property or privilege is claimed are defined as follows:

1. A spring-set power-released caliper brake, in combination with a clamped member having a pair of clamped surfaces, comprising a base means, first and second lever means each having an actuated end and an actuating end, each of said lever means pivotally mounted in said base means intermediate said actuated and said actuating ends, one of a pair of brake shoe means operatively mounted on said actuating end of each of said lever means, a spring-set power-released linear actuator means having housing and thruster portions, said housing portion operatively connected to said actuated end of said first lever means, compensating lever means pivotally mounted on said actuated end of said second lever means, said thruster portion of said linear actuator means operatively connected to said compensating lever means, toggle link means interconnecting said compensating lever means and said first lever means, the above mounting and connecting locations being the sole means of supporting said compensating lever means whereby relative movement and interaction of said first and second lever means and said linear actuator means and said compensating lever means and said toggle link means compensates for a spring actuation force which varies with movement of said thruster portion with respect to said housing portion of said linear actuator means and clamping forces of said brake shoe means on said clamped surfaces are maintained substantially constant throughout full actuation of said linear actuator means.

2. A spring-set power-released caliper brake as defined in claim 1, wherein said base means includes a pair of lug members separated by a centering member, said first and second lever means pivotally mounted between said lug members, power release of said linear actuator means forcing each of said lever means against said centering member and retracting said brake shoe means substantially uniformly with respect to said clamped member.

3. A spring-set power-released caliper brake as defined in claim 1, wherein said linear actuator means includes a mechanical coil compression spring and a fluid release chamber, said housing portion secured to said first lever means said thruster portion including piston means and thruster alignment means, said compression spring interacting between one end of said housing portion and one side of said piston means, said fluid release chamber defined by internal surfaces of said housing portion and the other side of said piston means.

4. A spring-set power-released caliper brake as defined in claim 1, wherein said brake shoe means include actuation lug means, said actuation lug means pivotally mounted on said actuating ends of said lever means, said base means and said actuation lug means having guide surfaces in slidable opposed relation, said guide surfaces substantially perpendicular to said clamped surfaces and substantially parallel to the direction of movement of said brake shoe means.

5. A spring-set power-released caliper brake as defined in claim 1, wherein said compensating lever means is pivotally mounted intermediate its ends on said actuated end of said second lever means, said thruster portion of said linear actuator means pivotally connected to one end of said compensating lever means, one end of said toggle link means pivotally connected to the other end of said compensating lever means, the other end of said toggle link means pivotally connected to said first lever means intermediate the axis of actuation of said liner actuator means and the axis upon which said first lever means is pivotally mounted in said base means.

6. A spring-set power-released caliper brake as defined in claim 1, wherein said actuated end of said first lever means includes a pair of lug means between which said thruster portion of said linear actuator means is disposed and between which one end of said toggle link means is pivotally mounted, said actuated end of said second lever means including a pair of lug means between which the other end of said toggle link means is pivotally connected to one end of said compensating lever means and between which said compensating lever means is pivotally mounted, said thruster portiion of said linear actuator being pivotally connected to the other end of said compensating link means.

7. A spring-set power-released caliper brake as defined in claim 1, wherein said toggle link means includes length adjusting means.

8. A spring-set power-released caliper brake in combination with a clamped member having a pair of clamped surfaces, comprising a base means, first and second levers each having an actuated end and an actuating end, each of said levers pivotally mounted in said base means intermediate said actuated and actuating ends, one of a pair of brake shoes operatively mounted on said actuating end of each of said levers, a spring-set power-released linear actuator having housing and thruster portions, said housing portion operatively connected to said actuated end of said first lever, compensating lever means having thruster and toggle ends, said compensating lever means pivotally mounted intermediate said thruster and toggle ends on said actuated end of said second lever, said thruster portion pivotally connected to said thruster end of said compensating lever means, toggle link means pivotally connected at one end to said toggle end of said compensating lever means and at the other end to said first lever intermediate the actuation axis of said linear actuator and the axis upon which said first lever is pivotally mounted in said base means, the above mounting and connecting locations being the sole means of supporting said compensating lever means whereby relative movement and interaction of said levers and said linear actuator and said compensating lever means and said toggle link means compensates for a spring force which varies as a function of stored spring energy and clamping forces of said brake shoe means on said clamped surface are maintained substantially constant throughout full actuation of said linear actuator.

* * * * *